W. J. RUNDLE.
DUMP CAR LATCH.
APPLICATION FILED JULY 12, 1920.
1,383,861.
Patented July 5, 1921.
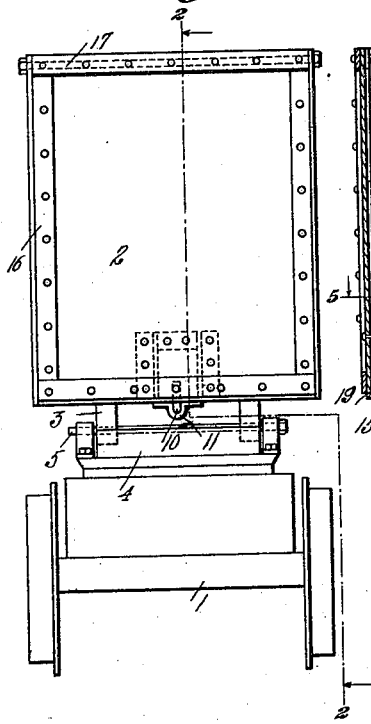
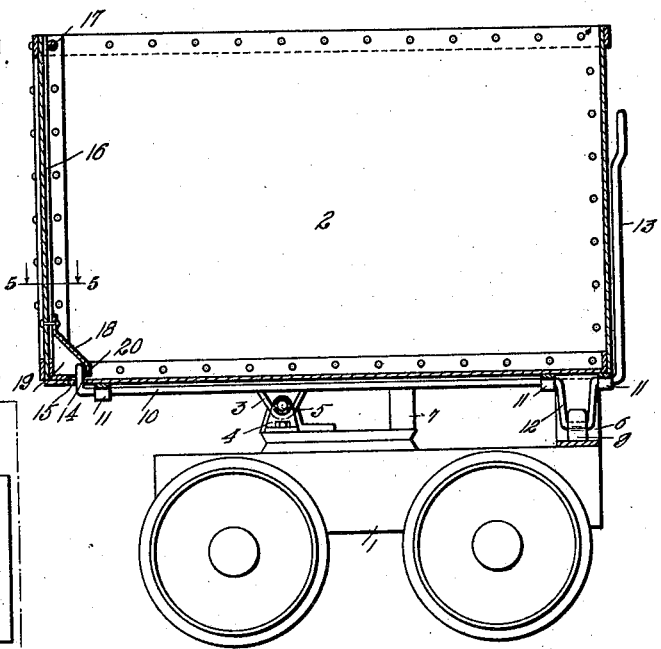
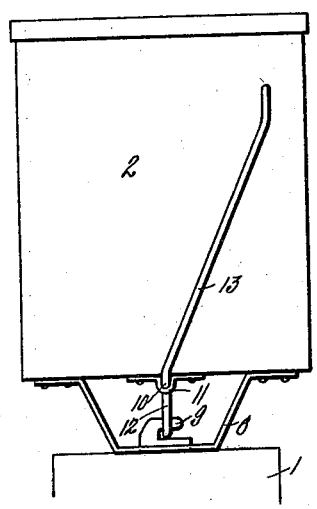
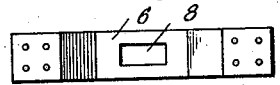
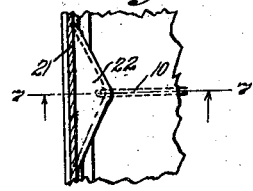
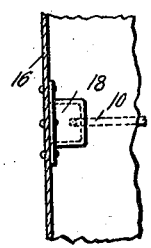
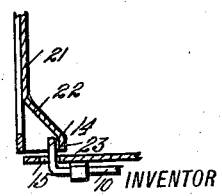
WITNESSES
INVENTOR
WILLIAM J. RUNDLE
BY
ATTORNEYS

UNITED STATES PATENT OFFICE.

WILLIAM J. RUNDLE, OF MEADERVILLE, MONTANA.

DUMP-CAR LATCH.

1,383,861. Specification of Letters Patent. Patented July 5, 1921.

Application filed July 12, 1920. Serial No. 395,475.

*To all whom it may concern:*

Be it known that I, WILLIAM JOHN RUNDLE, a citizen of the United States, and a resident of Meaderville, in the county of Silver Bow and State of Montana, have invented a new and Improved Dump-Car Latch, of which the following is a full, clear, and exact description.

This invention relates to improvements in dump car latches, an object of the invention being to provide a locking mechanism for dump cars which is located entirely under and within the car. With the old forms of dump cars, the latches are usually in an exposed position, so that contact with another car very often results in the breaking or bending of the locking mechanism.

A further object is to provide a latch mechanism of the character stated which will be comparatively cheap to manufacture, which may be readily installed on dump cars now in use, and which will be practical and durable in the use for which it is intended.

With these and other objects in view, the invention consists in certain novel features of construction and combinations and arrangements of parts which will be more fully hereinafter described and pointed out in the claims.

In the accompanying drawings—

Figure 1 is a view in front elevation of a dump car with my improved latch attached;

Fig. 2 is a view mainly in longitudinal section on the line 2—2 of Fig. 1;

Fig. 3 is a view in rear elevation of the dump car and locking mechanism;

Fig. 4 is a top plan view of the saddle 6;

Fig. 5 is a fragmentary view in section on the line 5—5 of Fig. 2;

Fig. 6 is a fragmentary view illustrating a modification; and

Fig. 7 is a view in section on the line 7—7 of Fig. 6.

Referring in detail to the drawings, 1 represents the supporting truck of a dump car. The body 2 of the car is mounted on the truck in the usual way. A pair of depending bearing brackets 3 rest on the curved upper face of a pillar block 4, and a rod 5 secured to the truck is passed through the brackets 3 so that the body 2 is fulcrumed at 5 and adapted to tip on the truck. A saddle 6, carried by the rear end of the body 2, limits the downward movement of the rear end of the body and supports the body on the truck. A block 7 may also be provided to support the body in horizontal position.

As shown clearly in Fig. 4, the saddle 6 is provided with an opening 8 to accommodate a hook 9 secured to the truck, which hook projects through the opening 8 in the saddle when the body 2 is in the horizontal position illustrated.

A crank shaft 10 extends longitudinally of the body 2 beneath the same, and is mounted in depending bearing brackets 11 secured to the body. Adjacent the rear end of the body, the shaft 10 is formed with a crank arm 12 adapted to engage the hook 9 and lock the body to the truck. The crank shaft 10 is provided with an integral crank lever 13 at the rear of the body and with a crank finger 14 at its forward end.

The crank finger 14 normally projects upwardly through an opening 15 in the bottom of the body. A door 16, which forms the forward wall of the body, is hinged at 17 and adapted to swing outwardly. A guard plate 18 is secured on the inner side of the door 16 to protect the finger 14 from the contents of the car, and forms in effect a pocket 19 within which the crank finger 14 is located. The finger 14 engages a depending flange 20 on the guard plate 18 and locks the door 16 in closed position.

Figs. 6 and 7 illustrate a modification, wherein a portion of the door 21 is bent or depressed inwardly to form a guard 22 for the finger 14 and protect it from the contents of the car. The finger engages a depending flange 23 on the guard 22 to maintain the door 21 in closed position.

The operation is substantially the same with both forms of the device. In order to remove the contents of the body 2, it is necessary to tip the body forwardly and open the door 16 or 21, as the case may be. The lever 13, shown in Fig. 3, is moved to the left, swinging the crank arm 12 out of engagement with the hook 9, and the finger 14 out of engagement with the flange 20. The car body may then be tipped forwardly and the door automatically swung open as the body is tilted. After the contents of the car have been removed and the body again returned to its horizontal position, the lever is operated to again lock the body and gate or door.

It is apparent that various slight changes and alterations might be made in the general form of the parts described without departing from my invention, and, hence, I do not limit myself to the precise details set forth but consider myself at liberty to make such slight changes and alterations as fairly fall within the spirit and scope of the appended claims.

I claim:

1. The combination with a dump car comprising a truck, a body pivoted on the truck, and a hinged door on the body, of a crank shaft located under the body, a crank lever controlling the position of said shaft, said body having an opening in the bottom thereof, and a crank finger on the crank shaft projecting through said opening and locking said door in closed position.

2. The combination with a dump car comprising a truck, a body pivoted on the truck, and a hinged door on the body, of a crank shaft located under the body, a crank lever controlling the position of said shaft, said body having an opening in the bottom thereof, a crank finger on the crank shaft projecting through said opening and locking said door in closed position, and means for protecting said crank finger from the contents of the body.

3. The combination with a dump car comprising a truck, a body pivoted on the truck, and a hinged door on the body, of a crank shaft located under the body, a crank lever controlling the position of said shaft, said body having an opening in the bottom thereof, a crank finger on the crank shaft projecting through said opening, a guard plate secured to said door forming a pocket in the body around said finger, and a flange on the guard plate engaging said finger.

4. In a dump car, the combination with a truck, of a body pivotally supported on the truck, a door forming one end of the body and hingedly connected thereto at its upper end, of a longitudinally positioned shaft having rotary mounting on the bottom of the body, an operating lever on one end of the shaft, a hook on the truck under the body, a crank arm on the shaft normally engaging the hook and holding the body in horizontal position on the truck, said door having a pocket at its lower edge, and a locking finger on the shaft normally in said pocket securing the door in closed position.

5. The combination with a dumping car comprising a truck, a body pivoted on the truck, and a hinged door on the body, of a locking device preventing pivotal movement of the body, a finger on the locking device projecting upwardly through the bottom of the car, a housing fixed to the door engaging and inclosing said finger, whereby the door is locked against movement and the finger is protected from the contents of the car.

WILLIAM J. RUNDLE.